United States Patent
Giebel et al.

(10) Patent No.: US 10,045,546 B2
(45) Date of Patent: Aug. 14, 2018

(54) ELECTRIC FOOD SMOKER

(71) Applicant: Masterbuilt Manufacturing, LLC, Columbus, GA (US)

(72) Inventors: Michael R. Giebel, Joplin, MO (US); Paul J. Simon, Elizabethtown, KY (US)

(73) Assignee: Masterbuilt Manufacturing, LLC, Columbus, GA (US)

( * ) Notice: Subject to any disclaimer, the term of this patent is extended or adjusted under 35 U.S.C. 154(b) by 125 days.

(21) Appl. No.: 15/047,006

(22) Filed: Feb. 18, 2016

(65) Prior Publication Data
US 2017/0238565 A1    Aug. 24, 2017

(51) Int. Cl.
  *A47J 37/04*    (2006.01)
  *A47J 37/07*    (2006.01)
  *A23B 4/052*    (2006.01)

(52) U.S. Cl.
  CPC ............. *A23B 4/052* (2013.01); *A23B 4/0523* (2013.01); *A47J 37/04* (2013.01); *A47J 37/07* (2013.01); *A47J 37/0709* (2013.01); *A23V 2002/00* (2013.01)

(58) Field of Classification Search
  CPC .. A47J 37/00; A47J 37/04; A47J 37/06; A47J 37/07–37/0709; A23B 4/044–4/056
  USPC ............. 99/467, 473–476, 480–482
  See application file for complete search history.

(56) References Cited

U.S. PATENT DOCUMENTS

| | | | |
|---|---|---|---|
| 652,531 A | 6/1900 | Carlson | |
| 2,984,171 A * | 5/1961 | Lee, Sr. | A47J 27/086 126/369 |
| 3,776,127 A | 12/1973 | Muse | |
| 4,663,517 A | 5/1987 | Huff et al. | |
| 4,697,506 A | 10/1987 | Ducate, Jr. | |
| 4,770,157 A | 9/1988 | Shepherd et al. | |
| 4,979,436 A * | 12/1990 | McGowan | A23B 4/052 126/25 R |
| 5,167,183 A * | 12/1992 | Schlosser | A47J 37/0713 126/25 R |
| 6,012,381 A * | 1/2000 | Hawn | A47J 27/14 126/25 R |
| 6,035,770 A | 3/2000 | Whitefield | |
| 6,626,089 B1 * | 9/2003 | Hubert | A47J 37/07 99/339 |
| 7,426,885 B2 | 9/2008 | McLemore et al. | |
| 7,703,389 B2 | 4/2010 | McLemore et al. | |
| D615,798 S | 5/2010 | McLemore et al. | |
| D616,243 S | 5/2010 | McLemore et al. | |
| 8,304,697 B2 | 11/2012 | McGhee, Jr. et al. | |
| D694,567 S | 12/2013 | McLemore et al. | |
| 8,939,068 B2 | 1/2015 | Cohen | |
| 2006/0137543 A1 | 1/2006 | McLemore et al. | |

(Continued)

*Primary Examiner* — Michael LaFlame, Jr.
(74) *Attorney, Agent, or Firm* — Smith, Gambrell & Russel, LLP (57) ABSTRACT

An electric food smoker includes a heating element that provides a main source of heat and a separate smoke element that is controlled independently from the heating element and provides heat to a wood chip box. Separate control of the heating element and the smoke element allows providing a cold smoke cycle for the food smoker. A hot smoke cycle provides independent control of the heating element and the smoke element according to a hot smoke program. A fast smoke cycle allows adding more smoke during any existing cycle.

4 Claims, 10 Drawing Sheets

(56) References Cited

U.S. PATENT DOCUMENTS

| | | | |
|---|---|---|---|
| 2009/0078127 A1 | 3/2009 | McLemore et al. | |
| 2010/0247721 A1* | 9/2010 | McGhee, Jr. | A23B 4/044 |
| | | | 426/235 |
| 2010/0310733 A1* | 12/2010 | Hoffman | F24C 7/00 |
| | | | 426/233 |
| 2011/0268853 A1 | 11/2011 | Cohen | |
| 2012/0251698 A1* | 10/2012 | Dennis | A47J 37/0709 |
| | | | 426/523 |
| 2013/0004633 A1* | 1/2013 | McMaster | A23B 4/052 |
| | | | 426/314 |
| 2013/0213243 A1 | 8/2013 | Borovicka et al. | |
| 2014/0360387 A1* | 12/2014 | Bogdon | A23B 4/0523 |
| | | | 99/476 |
| 2015/0047623 A1* | 2/2015 | Wiggins | F24C 15/005 |
| | | | 126/19 R |
| 2017/0020148 A1* | 1/2017 | Dixon | A47J 37/0629 |

* cited by examiner

| Hot Smoke Program ||
| Heating Element | Smoke Element |
| 1. Turn On until Temp Set Point is Reached, then Turn Off<br>2. When Temp Falls 5 degrees under Temp Set Point, Turn On until Temp Set Point is Reached, then turn off<br>3. Repeat step 2 | 1. Power On for 20 minutes<br>2. Power Off for 5 minutes<br>3. Power On for 5 minutes<br>4. Power Off for 10 minutes<br>5. Power On for 3 minutes<br>6. Power Off for 15 minutes<br>7. Repeat steps 5 and 6 |

ELECTRIC FOOD SMOKER

BACKGROUND

1. Technical Field

This disclosure generally relates to cooking food, and more specifically relates to an electric food smoker.

2. Background Art

Food smokers have been used for many years to smoke foods, especially meats. There are many different varieties of food smokers that use different fuels, including charcoal smokers, gas smokers, and electric smokers. Most known smokers include a wood chip box that includes a lid with slots or other openings near a heat source, and when the chip box is loaded with wood chips, the wood chips provide the smoke needed to smoke food. Most known food smokers have a single heat source, and lack many convenient features.

SUMMARY

An electric food smoker includes a heating element that provides a main source of heat and a separate smoke element that is controlled independently from the heating element and provides heat to a wood chip box. Separate control of the heating element and the smoke element allows providing a cold smoke cycle for the food smoker. A hot smoke cycle provides independent control of the heating element and the smoke element according to a hot smoke program. A fast smoke cycle allows adding more smoke during any existing cycle.

Various enhancements are included in the food smoker. A water fill door connected to a water fill spout allows adding water to the water try from the outside of the smoker, without opening the smoker door. A vent near the wood chip box allows controlling the amount of air that enters the cooking chamber, and enhances the combustion of the wood chips in the wood chip box. A water tray has outer flanges that substantially cover the heating element, with louvers in the outer flanges to allow heat from the heating element to rise to the level of the food. The wood chip box includes holes to help in combustion of wood chips within the wood chip box. The wood chip box additionally includes a bottom recess that allows the wood chip box to slide into place atop the smoke element so the wood chip box rests on the smoke element. The wood chip box has a hinged lid that allows emptying ashes from the wood chip box with one hand. A light on the smoker shines down from a control panel, through a lens on the door, and off a reflector in the door then reflects the light into the cooking chamber. A convection fan can optionally be added that increases airflow within the cooking chamber.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and.

DETAILED DESCRIPTION

The disclosure and claims herein relate to an electric food smoker that includes a heating element that provides a main source of heat and a separate smoke element that is controlled independently from the heating element and provides heat to a wood chip box. Separate control of the heating element and the smoke element allows providing a cold smoke cycle for the food smoker. A hot smoke cycle provides independent control of the heating element and the smoke element according to a hot smoke program. A fast smoke cycle allows adding more smoke during any existing cycle.

Figure 1:
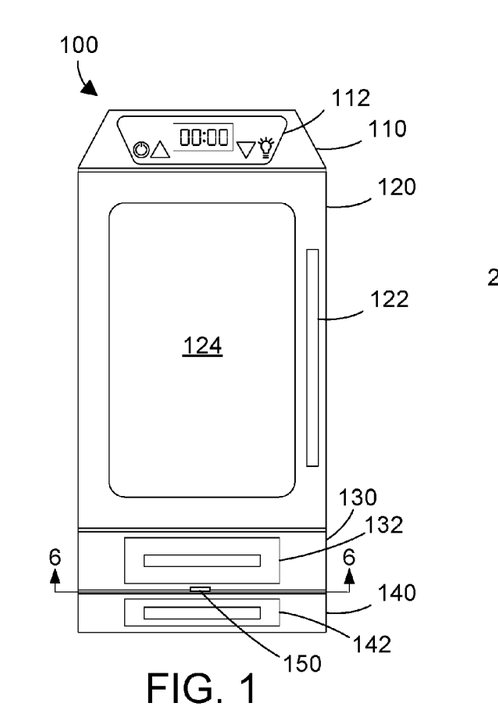
FIG. 1 is a front view of an electric smoker as disclosed and claimed herein.

Referring to FIG. 1, an electric smoker 100 includes a top portion 110 with a keypad/display 112, a door 120, a lower panel 130 that receives a wood chip box 132, and a bottom panel 140 with a grease tray 142. The door 120 includes a handle 122 and a glass panel 124 that allows viewing the food in the cooking chamber. A vent control tab 150 allows opening or closing a vent near the wood chip box 132, as shown in more detail in FIGS. 6 and 7.

Figure 2:
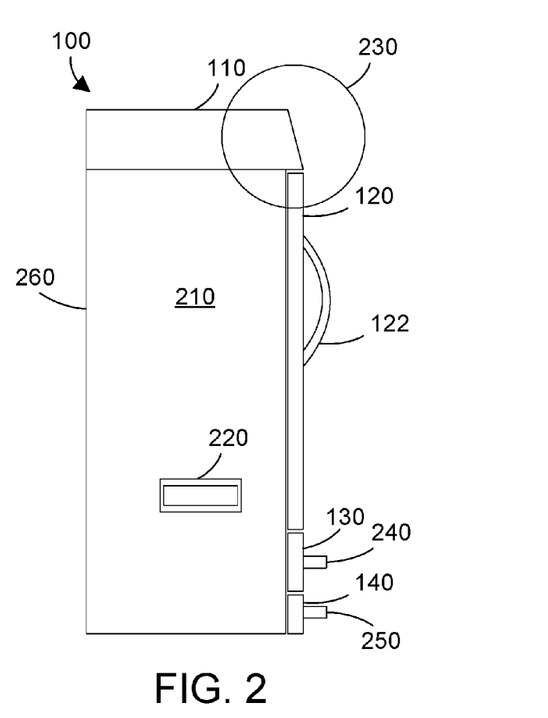
FIG. 2 is a side view of the electric smoker shown in FIG. 1.

FIG. 2 shows a left side view of the smoker 100 shown in FIG. 1. The left side 210 of the smoker preferably includes a water fill door 220 that allows adding water to the water pan inside the cooking chamber without opening the door 120, as described in detail below with reference to FIGS. 3-5. Handle 240 of the wood chip box 132 is shown in FIG. 2, along with handle 250 of the grease tray 142, which slides out like a drawer for removing the grease and for cleaning. An area 230 is shown, which is enlarged in FIG. 16 to show how a light in the control panel can illuminate the cooking chamber. The smoker 100 preferably has a cabinet as shown in FIGS. 1 and 2 and that includes a left side panel 120, a back panel 260, a right side panel, and a door 120 that define a cooking chamber.

Figure 3:
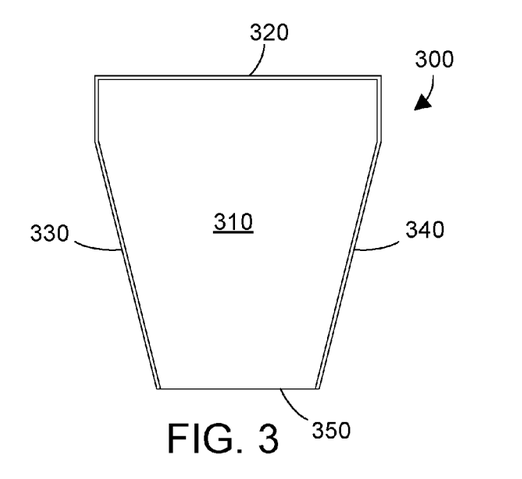
FIG. 3 is a top view of a water fill spout.

A water fill spout 300 is shown in FIG. 3, which includes a bottom 310, a back 320, a left side 330, a right side 340, and a front 350 that serves to discharge the water from the water fill spout 300 into the water pan. Note the back 320 and sides 330 include sidewalls while the front 350 does not, which causes any water in the water fill spout 300 to be discharged out the front 350.

Figure 4:
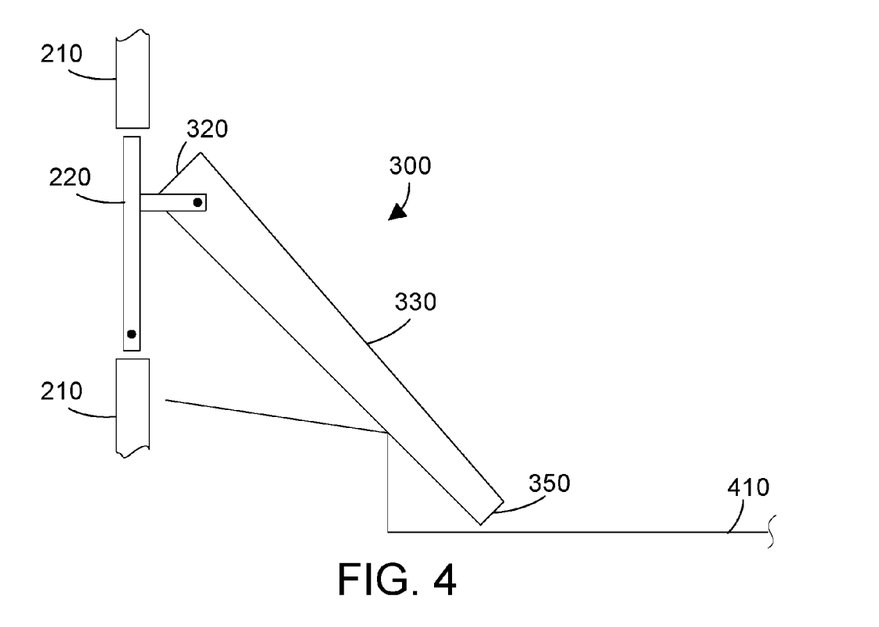
FIG. 4 is side view of the water fill spout when the water fill door is closed.
Figure 5:
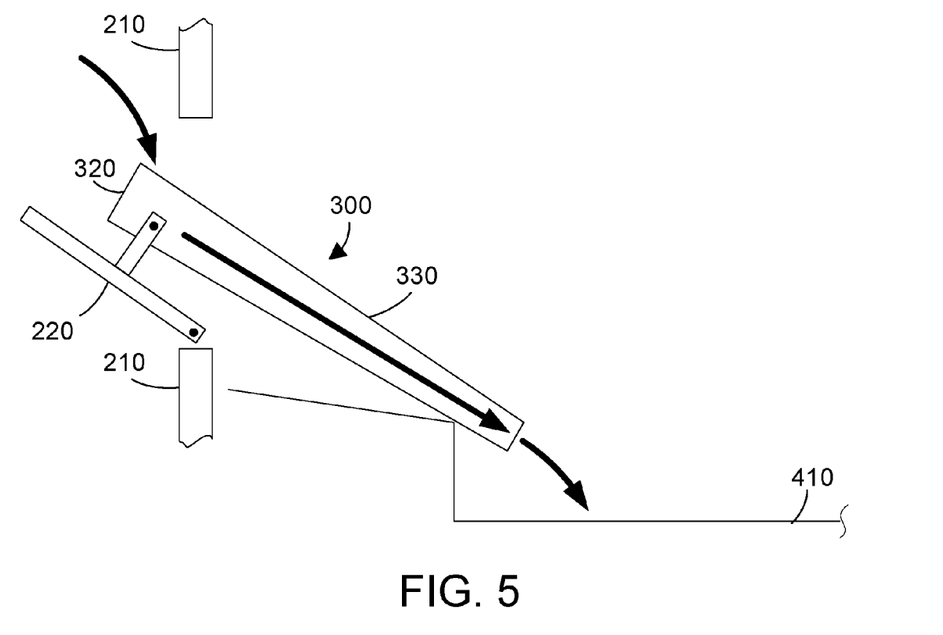
FIG. 5 is a side view of the water fill spout when the water fill door is open, allowing water to be added to the water tray from the outside of the smoker.

FIGS. 4 and 5 show the water fill spout 300 in FIG. 3 connected to the water fill door 220 shown in FIG. 2. The water fill door 220 is coupled to the side panel 210 using a suitable hinge-type connection towards its bottom so the top of the water fill door 220 pivots away from the side panel 210 as shown in FIG. 5. In the most preferred implementation, the water fill door 220 preferably includes a stop mechanism that prevents the water fill door 220 from pivoting open substantially more than ninety degrees. The water fill spout 300 is coupled to the water fill door 220 using any suitable connection, such as a hinge-type connection. When the water fill door 220 is closed as shown in FIG. 4, the water fill spout 300 is inaccessible from the outside of the smoker. When the water fill door 220 is opened as shown in FIG. 5, the back part of the water fill spout 300 is now accessible from the outside of the smoker, allowing water to be added from the outside of the smoker. The water is represented by the dark arrows in FIG. 5. Thus, with the water fill door open as shown in FIG. 5, water can be poured from outside the smoker into the water fill spout 300, which then flows down the water fill spout 300 into the water pan 410. Providing the water fill door 220 and water fill spout 300 is a great advantage because the door 120 need not be opened to add water to the water tray. When a smoker door is opened, it takes some time for the smoker to get back up to the desired temperature. Thus, the less the door of a smoker is opened, the better, so the water fill door 220 and water fill spout 300 provide an improvement over known methods of adding water to a water tray in a smoker, which always requires opening the door of the smoker. The water fill door 220 and spout 300, while shown in the figures on the left side of the smoker, could be located in any suitable location that allows adding water to the water pan, including without limitation the back and the right side of the smoker.

Figure 6:
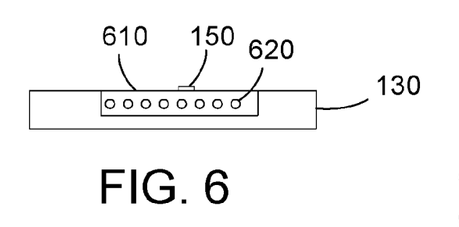
FIG. 6 is a cross-sectional view of the smoker in FIG. 1 taken along the line 6-6 showing a vent near the wood chip box with the vent open.
Figure 7:
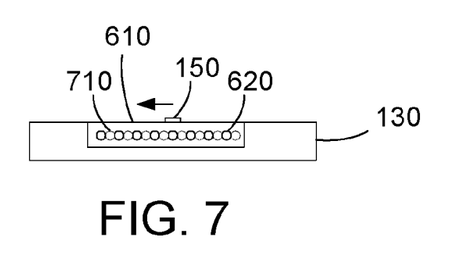
FIG. 7 is a view of the vent in FIG. 6 with the vent closed.

FIGS. 6 and 7 show a bottom view of the lower panel 130 shown in FIG. 1 along the lines 6-6. At the bottom of the lower panel 130 is a slidable vent cover 610 that includes multiple holes 620. The vent is shown open in FIG. 6, with the holes 620 aligned with corresponding holes in the bottom panel 130, which allows air to flow into the cooking chamber near the wood chip box. The slidable vent cover 610 includes a vent control tab 150 that can be used to slide the vent cover 610 left or right. When the vent cover 610 is slid to the left by pushing the vent control tab 150 to the left as shown by the arrow in FIG. 7, the holes 610 in the vent cover 610 no longer align with the corresponding holes 710 in the bottom panel 130, shown in phantom in FIG. 7. The vent shown in FIG. 7 is thus closed. While the vent is shown fully open in FIG. 6 and fully closed in FIG. 7, the vent can also be partially open, allowing a great deal of adjustability regarding the airflow that enters the cooking chamber near the wood chip box. Providing a vent near the wood chip box provides much better control over how quickly and how well the wood chips in the wood chip box combust. This is especially desirable for cold smoking, where the airflow provided by the vent allows the wood chips to wick faster.

Figure 8:
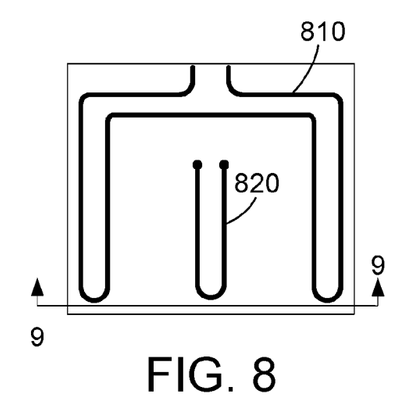
FIG. 8 is a top view showing two independently-controlled heating elements in the cooking chamber.
Figure 9:
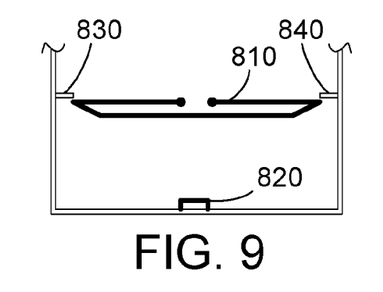
FIG. 9 is a front view of the cooking elements shown in FIG. 8.
Figure 10:
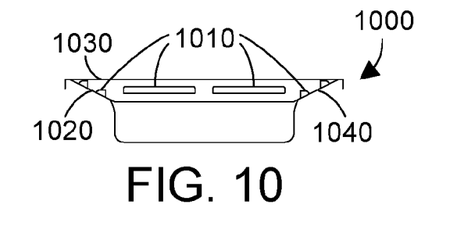
FIG. 10 is front view of a water pan designed to sit on the heating element 810 shown in FIG. 9 with louvers that allow heat to rise through the louvers.
Figure 11:
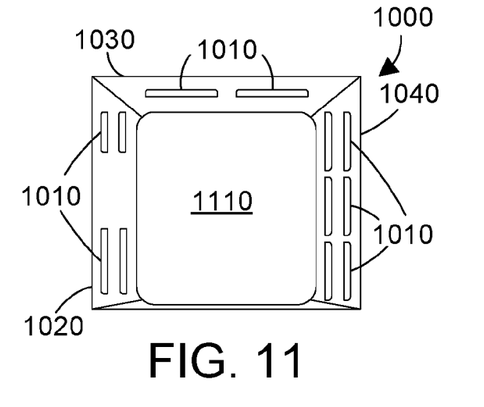
FIG. 11 is a top view of the water pan in FIG. 10.

The smoker 100 includes multiple elements that can be independently controlled, thereby providing capability not found in known smokers. Referring to FIG. 8, a top view looking within the cooking chamber of smoker 100 shown in FIGS. 1 and 2 shows a heating element 810 and a smoker element 820. While both heating element 810 and smoker element 820 are "heating elements" in a general sense, the labels of heating element 810 and smoker element 820 are used herein to distinguish between these two different elements. FIG. 9 shows a front view of the elements in FIG. 8 taken along the line 9-9. Supports 830 and 840 provide structural support on which a water pan rests. In the most preferred implementation, supports 830 and 840 include slots for receiving corresponding tabs that are bent down on the sides of the water pan 1000, as shown in FIG. 10, so when the tabs of the water pan are placed in the slots, the water pan 1000 is positioned correctly. The heating element 810 preferably includes two parts that provide an angled surface that conform to a corresponding angled surface on a water pan, as shown in FIGS. 10 and 11. The smoke element 820 is provided at the bottom of the cooking chamber in a position such that the wood chip box can be slid into place atop the smoke element 820. In the most preferred implementation, the wood chip box 132 rests atop the smoke element 820 when slid into place through the lower panel 130, providing direct conduction of heat from the smoke element 820 to the bottom of the wood chip box. In an alternative implementation, the wood chip box 132 does not actually contact the smoke element 820, but is close proximity to the smoke element such that heat from the smoke element 820 enhances combustion of wood chips in the wood chip box.

In the most preferred implementation, the heating element 810 is from 1,000-1,250 watts, while the smoker element 820 is from 150-300 watts. Of course, other ranges of wattages for these elements could also be used within the scope of the disclosure and claims herein. In the most preferred implementation, the power rating of the smoker element 820 is less than a third of the power rating of the heating element 810. Providing independent control of elements 810 and 820 allows cold smoking, which is a function not supported by most commercially-available smokers for home use.

A water pan 1000 is shown in FIGS. 10 and 11. The water pan 1000 includes a left side 1020, a back 1030 and a right side 1040. Note the left side 1020, back 1030 and right side 1040 include angled surfaces that are disposed just above the heating element 810 when the water pan 1000 is properly installed resting on the supports 830 and 840 shown in FIG. 9. The water pan 1000 includes a reservoir 1110 for holding water. Known smokers typically have water pans that are substantially smaller than the cross-sectional area of the cooking chamber because heat needs to be able to rise from the heating element below to where the food is placed in the cooking chamber above. For example, some smokers that have a square or rectangular cross-section for the cooking chamber use circular metal bowls as a water tray. While providing a water pan that provides significant areas not covered allows the heat to rise, the parts not covered by the water pan will have grease that drips down and must be cleaned after cooking. The water pan 1000 preferably covers the vast majority of the cross-sectional area of the cooking chamber, and most preferably covers the heating element 810. To allow the heat from the heating element 810 to rise up to the level of the food in the cooking chamber, the water pan 1000 includes louvers 1010. In the most preferred implementation, the left side 1020 has a portion that does not have louvers 1010, which is where the water fill spout shown in FIGS. 3-5 overlies the water pan 1000. The water pan 1000 thus provides a significant advantage over known water pans in smokers by covering almost all of the cross-sectional area of the cooking chamber so almost all of the grease that drips down will be caught by the water pan 1000, while at the same time allowing the heat from the heating element 810 to pass through the louvers 1010 and rise up to the level of the food in the cooking chamber.

Figure 12:
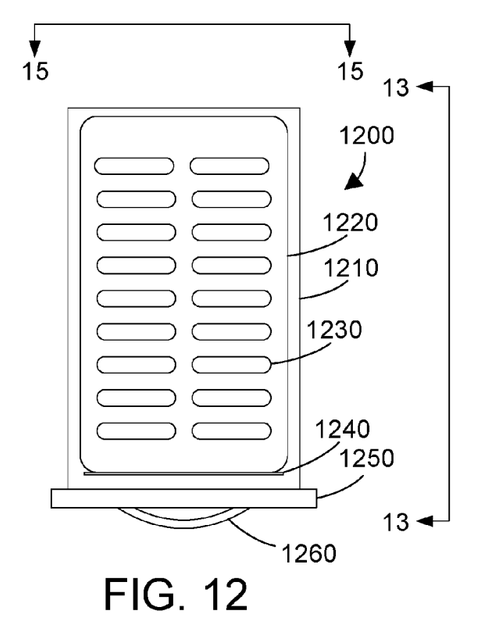
FIG. 12 is a top view of a wood chip box.

A wood chip box 1200 is shown in FIGS. 12-15, and is one suitable implementation for the wood chip box 132 shown in FIG. 1. Referring to FIG. 12, the wood chip box 1200 includes a lid 1220 that is coupled by a hinge-type coupling 1240 to a flat upper plate 1210. The upper plate 1210 is coupled to a front portion 1250 that includes a handle 1260 that allows sliding the wood chip box 1200 into the lower panel 130 shown in FIG. 1, and removing the wood chip box 1200 by pulling the handle 1260 and sliding the wood chip box 1200 out of the lower panel 130, in the same way a drawer is slid into and out of a cabinet. The lid 1220 of the wood chip box includes openings, one of which is shown as 1230 in FIG. 12, that allow smoke to rise from the wood chip box into the cooking chamber as the wood chips within the wood chip box combust. While the openings are shown in FIG. 12 to be oval-shaped openings, any suitable shape and size of openings could be used in the lid 1220 of the wood chip box 1200.

Figure 13:
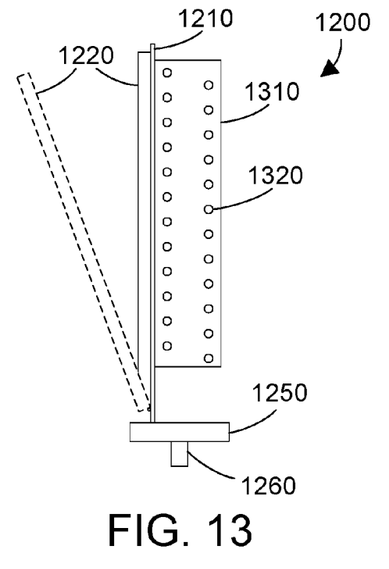
FIG. 13 is a side view of the wood chip box in FIG. 12 taken along the line 13-13.
Figure 14:
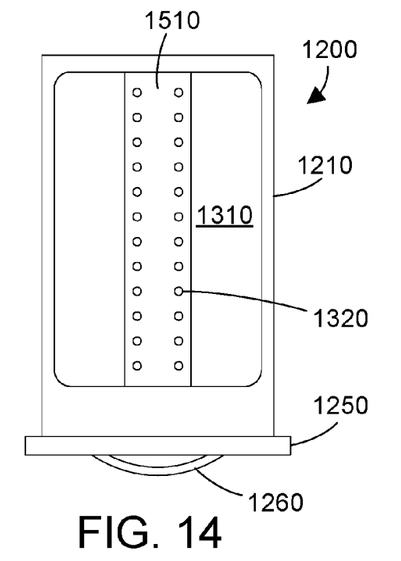
FIG. 14 is a bottom view of the wood chip box.
Figure 15:
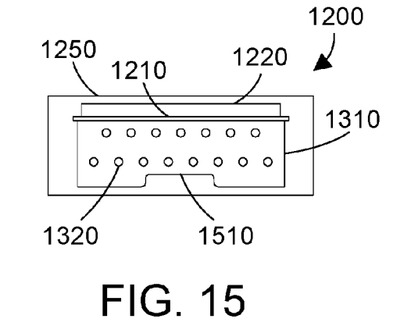
FIG. 15 is a back view of the wood chip box in FIG. 12 taken along the line 15-15 showing the bottom recess that allows the wood chip box to slide into place atop the smoke element shown in FIG. 9.

A side view of the wood chip box 1200 in FIG. 12 taken along the line 13-13 is shown in FIG. 13. Not viewable in FIG. 12 is the wood chip box 1310 that underlies the upper plate 1210. The wood chip box 1310 preferably includes multiple holes 1320 on the side as shown in FIG. 13, on the back as shown in FIG. 15, and may optionally include holes on the bottom as shown in FIG. 14. Providing holes in the wood chip box 1310 allows airflow into the wood chip box 1310, which helps the wood chips to start burning faster and enhances combustion of the wood chips in the wood chip box 1310 and helps the wood chips to wick for cold smoking. The combination of the sliding vent shown in FIGS. 6-7 and the holes in the wood chip box shown in FIGS. 13-15 provide a way to enhance combustion of the wood chips in the wood chip box according to the user's preference. Note that combustion when used to refer to wood chips means keeping the wood chips hot enough to smoke without creating a fire in the wood chips. To help obtain smoke and not fire, it is common to soak wood chips in water for some period of time before placing the wood chips in the wood chip box. Wet wood chips will smoke with a lower likelihood of flame when compared to dry wood chips. Note the number of holes, location of holes, and sizes of holes in the wood chip box can vary within the scope of the disclosure and claims herein.

The lid 1220 in FIG. 13 is shown in a closed position in solid lines, and in an open position in dotted lines to show how the lid is attached via a hinge connection to the upper plate 1210. This allows ashes and remains of burned wood chips to be emptied from the wood chip tray 1200 using one hand by grabbing the handle 1260, sliding the wood chip box 1200 out of the lower panel 130, then turning the wood chip box 1200 upside down by rotating the handle 1260, which will cause the lid 1220 to open by the force of gravity and will cause the contents of the wood chip box to fall out by the force of gravity. This one-handed operation to dispose of what's left in the wood chip box is much easier than the two-handed operations that are required to empty known wood chip boxes, and is safer when the wood chip box is hot.

The bottom of the wood chip box 1310 includes a recess 1510 along its length as shown in FIGS. 14 and 15 that is dimensioned for receiving the smoker element 820 shown in FIGS. 8 and 9. As stated above, in the most preferred implementation the recess 1510 allows the wood chip box 1310 to rest on the smoker element 820 in direct contact, but an alternative non-contact implementation could also be used.

Figure 16:
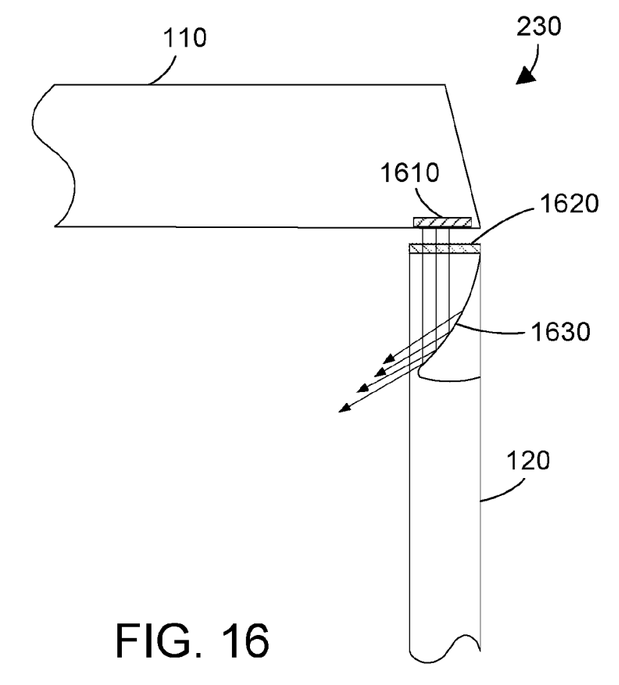
FIG. 16 is an enlarged view of area 230 shown in FIG. 2 showing how a light in the control panel illuminates the cooking chamber.

One problem with known smokers is trying to see the food as it smokes. Most known smokers have metal doors so the only way to look at the food is to open the door. Some smokers provide a glass pane on the door so the food can be seen through the glass pane. However, without a light it is often hard to see the food well. Installing a light in the cooking chamber of a smoker is problematic because the bulb or a lens covering the bulb would quickly be covered with smoke residue, which would dim the effectiveness of the light. The smoker 100 overcomes these problems by providing a light outside of the cooking chamber that shines into the cooking chamber, thus allowing a user to easily see the food being smoked. Referring to FIG. 16, the portion 230 shown in FIG. 2 is enlarged. The top portion 110 includes a light source 1610 within the top portion 110 that shines light downward on the top of the door 120. The door 120 includes a lens 1620 through which the light from the light source 1610 passes. The door 120 also includes a reflector 1620 so the light from the light source 1610 through the lens 1620 is reflected into the cooking chamber, as shown by the arrows in FIG. 16. The light source 1610 is thus protected from smoke and heat by not being in the cooking chamber, yet very effectively illuminates the cooking chamber through the lens 1620 and reflector 1630 on door 120.

In one suitable implementation, the light source 1610 comprises one or more light-emitting diodes (LEDs) that could be located, for example, on the circuit board for the keypad/display 112 shown in FIG. 1. Of course, other light sources could also be used within the scope of the disclosure and claims herein. The lens 1620 could be made of any suitable material that is mostly transparent, including glass and plastic, such as acrylic. The reflector 1630 could be made of any suitable reflective material including metal, reflective plastic, or metal-coated plastic that will not deform under the normal operating temperatures experienced in the door of the smoker.

Figure 17:
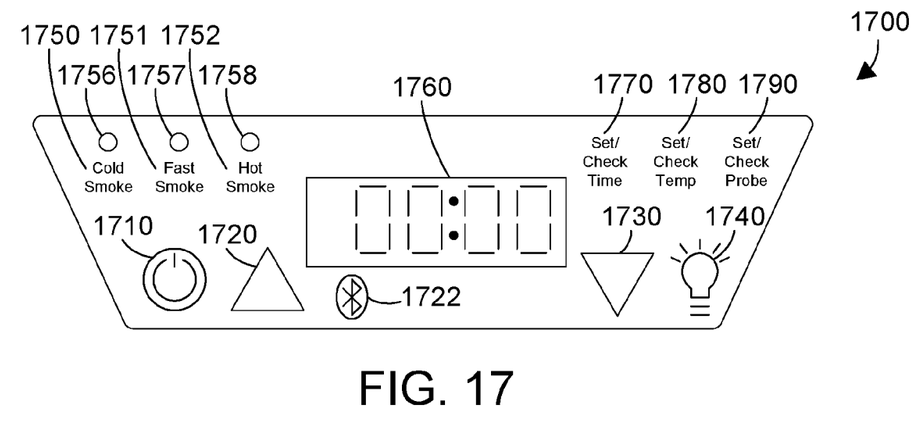
FIG. 17 is an enlarged view of one possible implementation for the control panel for the smoker.

One specific implementation for the keypad/display 112 shown in FIG. 1 is keypad/display 1700 shown in FIG. 17. Keypad/display 1700 includes a power button 1710, an up button 1720, a Bluetooth button 1722, a down button 1730, a light button 1740, buttons for cold smoke 1750, fast smoke 1751 and hot smoke 1752, corresponding light indicators for cold smoke 1756, fast smoke 1757 and hot smoke 1758, a display 1760, a button 1770 to set or check the time, a button 1780 to set or check the temperature, and a button 1790 to set or check the temperature of the probe. The power button 1710 turns on the keypad/display 1700 when pressed, and turns off the keypad/display 1700 when pressed again. To be sure an inadvertent press of the power button 1710 does not turn the smoker off when the user did not mean to turn the smoker off, the power button could require a press of two or three seconds before turning the smoker off. The up button 1720 is used to increase the temperature or time for a cycle. Similarly, the down button 1730 is used to decrease the temperature or time for a cycle. The Bluetooth button 1722 is optional, and when present is used to pair the controller in the smoker to a suitable Bluetooth-compatible device, such as a smart phone. Note that Bluetooth is one particular type of wireless interface that could be used, but the disclosure and claims herein extend to any suitable wireless interface and protocol, whether currently known or developed in the future. A smart phone is one suitable example of a handheld electronic device that could control the controller via a wireless interface. An infrared or radio-frequency remote control is another example of a handheld device that could control the controller via a wireless interface. A smart phone running a suitable app can thus be used to control the smoker instead of manually pressing buttons on the keypad/display 1700. One advantage of using an app on a smart phone is the user could create a list of favorite cycles for the smoker, and could then select one of the favorite cycles, which will program the smoker via Bluetooth for the needed mode, time and temperature without the user needing to manually program these things for each cycle.

The light button 1740 turns on the light for the cooking chamber when pressed, then turns off the light for the cooking chamber when pressed again. A suitable example for the light is shown in FIG. 16. The cold smoke button 1750 is used to start a cold smoke cycle. The fast smoke button 1751 is used to start a fast smoke cycle. A hot smoke button 1752 is used to start a hot smoke cycle. The cold smoke indicator 1756 lights to indicate a cold smoke cycle is in progress. The fast smoke indicator 1757 lights to indicate a fast smoke cycle is in progress. The hot smoke indicator 1758 lights to indicate a hot smoke cycle is in progress. In the most preferred implementations, cold smoke and hot smoke are mutually exclusive, meaning only one of these can run at a time. Fast smoke, however, can run simultaneously with a cold smoke cycle or a hot smoke cycle.

Display 1760 is used to display time, temperature and status of the smoker. In the specific implementation shown in FIG. 17, display 1760 includes four characters, but any suitable display could be used, including a multi-line alphanumeric display, a scrolling display, etc. The set/check time button 1770 allows a user to set the time for a cycle when initially programming the cycle, and also allows a user to check the time remaining during a cycle. The set/check temp button 1780 allows a user to set the temperature for a cycle when initially programming the cycle, and also allows the user to check the current temperature in the cooking chamber or change the temperature during a cycle. The set/check probe button 1790 allows a user to set the temperature for the probe when initially programming the cycle, and also allows the user to check the current temperature or change the temperature of the probe during a cycle.

A simple example will illustrate how the keypad/display 1700 could be used. Let's assume a user wants to hot smoke some food. The user places the food on a rack in the cooking chamber, puts water in the water pan, puts wood chips in the wood chip box, and is now ready to start a hot smoke cycle. The user presses the power button 1710 to turn the keypad/display on. The user presses the hot smoke button 1758, which starts a hot smoke cycle with default temperature and time values. The user then presses the set/check time button 1770 followed by the up arrow 1720 or down arrow 1730 to change the default smoking time for the hot smoke cycle. The user then presses the set/check temp button 1780 followed by the up arrow 1720 or down arrow 1730 to change the default temperature for the hot smoke cycle. If the user wants to use a probe that detects internal temperature of the food being smoked, the user can also push the set/check probe button 1790 followed by the up arrow 1720 or down arrow 1730 to set a desired temperature for the probe. The food is then smoked using the hot smoke program (discussed in more detail below with reference to FIGS. 19 and 20) until the timer reaches zero, at which point an audible alarm sounds and both the heating element and the smoker element are turned off.

Figure 18:
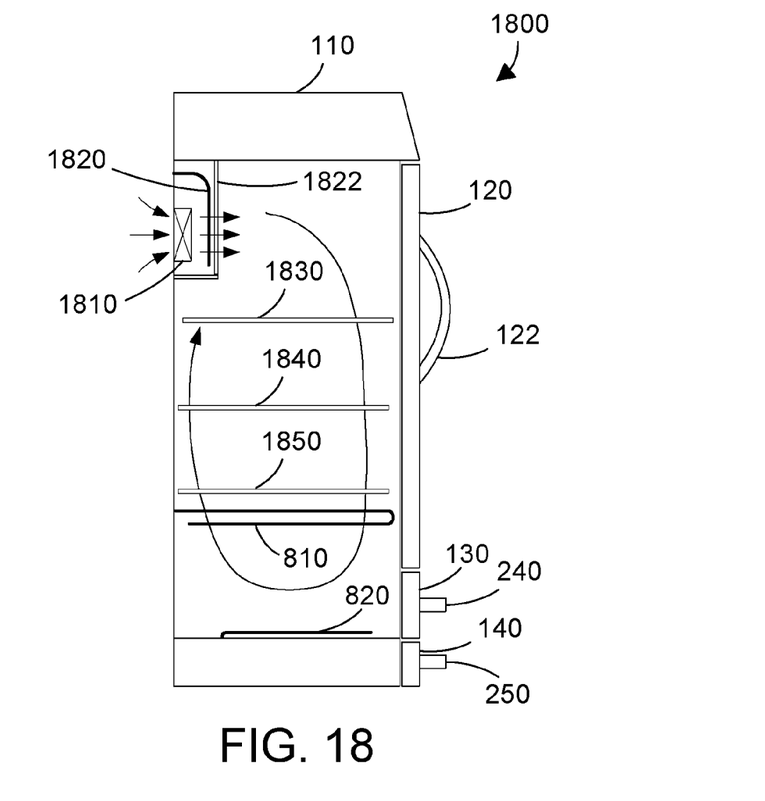
FIG. 18 is a cross-sectional side view of the smoker 100 shown in FIG. 1 with the addition of a convection fan to circulate the air within the cooking chamber.

An optional feature that could be provided in the smoker 100 is a convection fan to help circulate the heat in the cooking chamber. Referring to FIG. 18, a side cross-sectional side view of a smoker 1800 shows three cooking racks 1830, 1840 and 1850 in the cooking chamber, with the heating element 810 and smoke element 820 as shown in FIGS. 8 and 9. The wood chip box and water pan are not shown in the cooking chamber to simplify the drawing. A fan 1810 takes in ambient air and pushes the air over a third element 1820 and through openings in a heat shield 1822 into the cooking chamber, as shown in FIG. 18. The element 1820 could be of any suitable wattage. In one specific implementation, element 1820 has a wattage of 200-300 watts. The fan forces the air around the food on the cooking racks and around the heating element 810, thereby providing a very even distribution of heat within the cooking chamber. Most known smokers have a very uneven distribution of heat in the cooking chamber. The addition of a convection fan 1810 provides much more even distribution of heat, as is very well-known in the context of convection ovens. But convection fans have not been used in smokers. The smoker 1800 thus provides an optional enhancement in the form of a convection fan 1810 that circulates the air in the cooking chamber. In an alternative configuration, element 1820 could be a 1,000-1,250 watt element that replaces the heating element 810.

Many variations to the configuration in FIG. 18 are possible. For example, providing a fan 1810 without an additional element 1820 and without a heat shield 1822 will still provide circulation of the heat generated by the heating element 810. In addition, while the fan 1810 is shown in FIG. 18 on the back side of the smoker, the fan could be located at any suitable location on the smoker. Furthermore, while a single fan is shown, multiple fans could also be used. Additionally, the fan 1810 could run all the time, or could selectively run under the control of the control panel.

Figure 19:
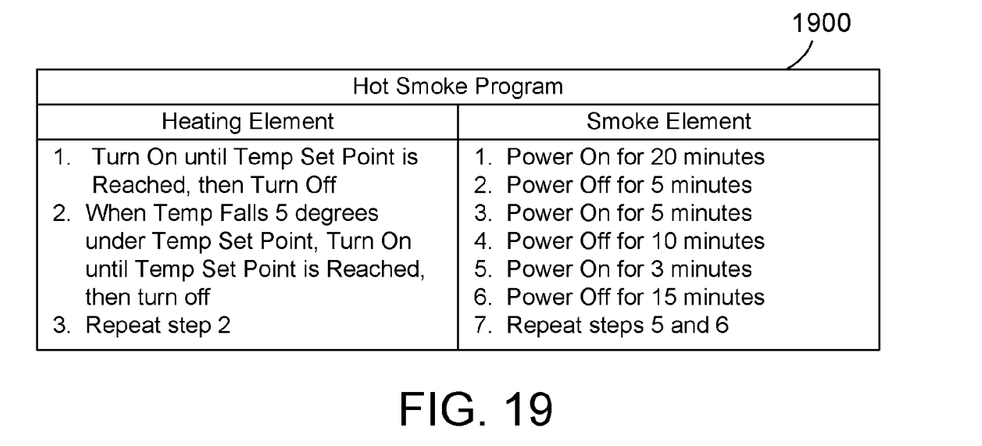
FIG. 19 shows a table with a hot smoke program that independently controls the heating element and smoke element.

The ability to independently control the heating element 810 and smoke element 820 allows providing smoke cycles that independently turn these elements on and off. The heating element 810 may be turned on and off independently of the state of the smoke element 820 element and the smoke element 820 may be turned on and off independently of the state of the heating element 810 according to multiple programs available on the smoker. One example of a suitable hot smoke program 1900 is shown in FIG. 19. For the heating element 810, the heating element is turned on until the programmed temperature set point is reached, then the heating element is turned off (step 1). When the temperature in the cooking chamber falls 5 degrees Fahrenheit (2.8 degrees Celsius) under the temperature set point, the heating element is turned on until the temperature set point is reached, then turned off (step 2). Step 2 is repeated until the time for the hot smoke cycle expires (step 3). The smoke element is powered on an off independently from the heating element. The hot smoke program in FIG. 19 for the smoke element specifies to power on the smoke element for 20 minutes (step 1), then power off for 5 minutes (step 2), then power on for 5 minutes (step 3), then power off for 10 minutes (step 4), then power on for 3 minutes (step 5), then power off for 15 minutes (step 6), then repeat steps 5 and 6 until the time for the hot smoke cycle expires.

Figure 20:
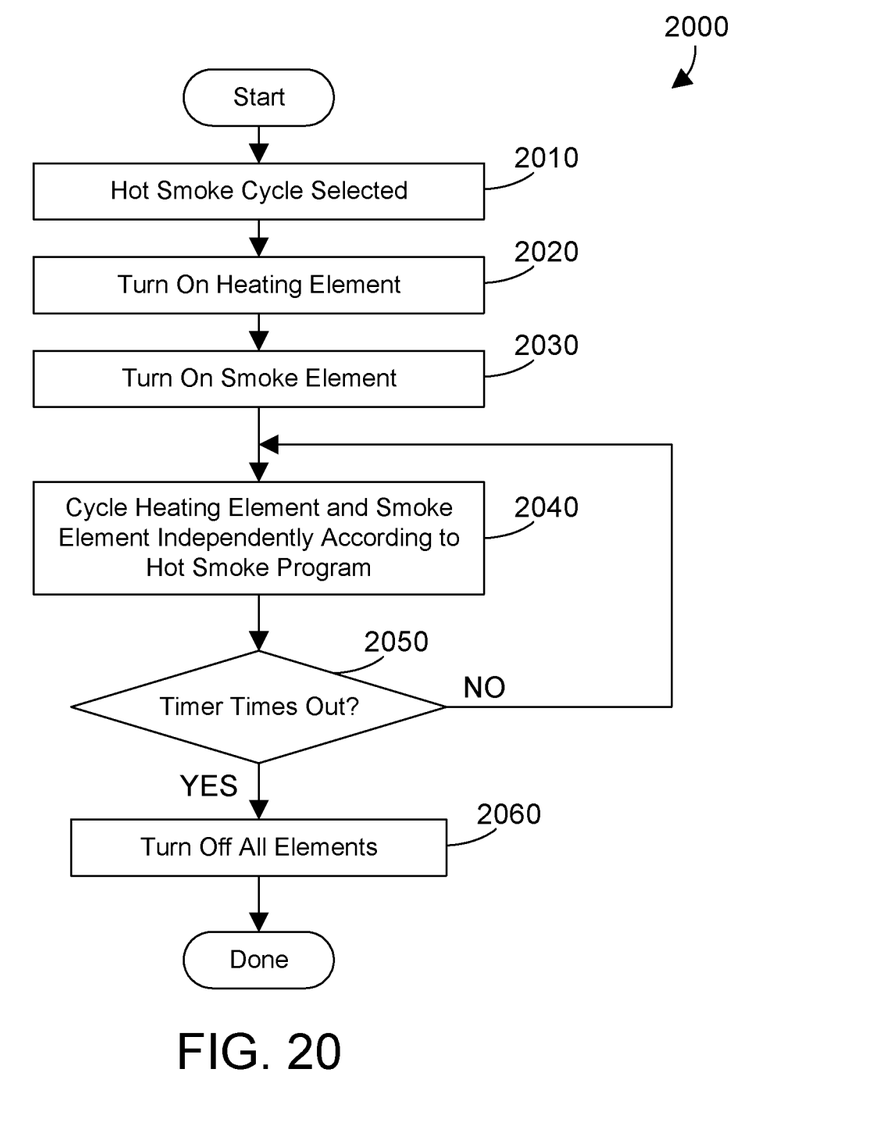
FIG. 20 is a flow diagram of a method for a hot smoke cycle.

Referring to FIG. 20, a method 2000 shows suitable steps for a hot smoke cycle. A hot smoke cycle is selected (step 2010). This could be done by a user pressing the hot smoke button, or by the user selecting a hot smoke cycle on an app on a smart phone coupled via Bluetooth to the smoker. In one suitable implementation, a hot smoke cycle has an allowable temperature range of 125 degrees Fahrenheit (52 degrees Celsius) to 290 degrees Fahrenheit (143 degrees Celsius). At the beginning of the hot smoke cycle, the heating element is turned on (step 2020) and the smoke element is turned on (step 2030). The heating element and smoke element are then cycled independently from each other according to the hot smoke program (step 2040). One suitable example of a hot smoke program is shown at 1900 in FIG. 19. As long as the time does not time out (step 2050=NO), method 2000 loops back to step 2040 and continues until the timer times out (step 2050=YES), at which time all of the elements are turned off (step 2060). Method 2000 is then done.

Figure 21:
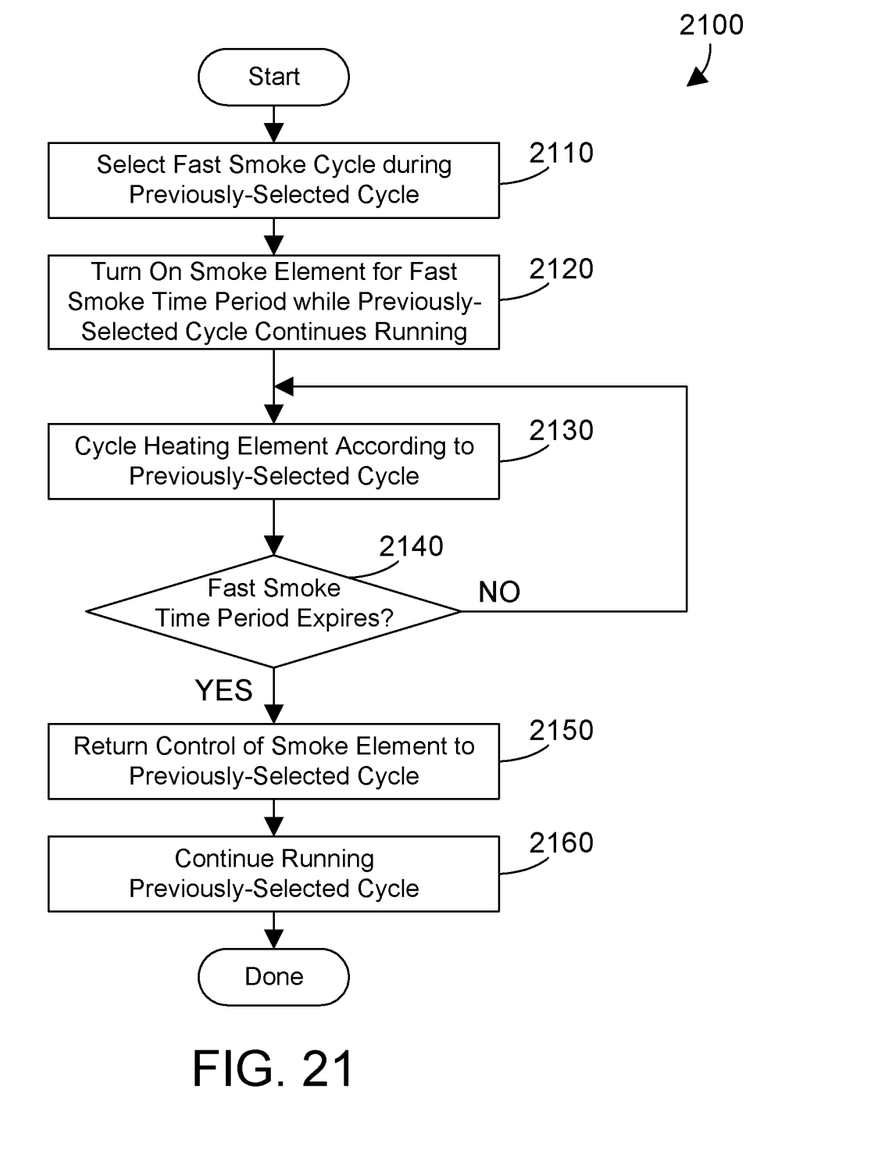
FIG. 21 is a flow diagram of a method for a fast smoke cycle.

A cycle referred to herein as a "fast smoke cycle" is provided as disclosed herein as a way to increase the amount of smoke during either a hot smoke cycle or a cold smoke cycle. A fast smoke cycle is not known in the art. Method 2100 in FIG. 21 illustrates steps taken for a fast smoke cycle. A fast smoke cycle is selected when a previously-selected cycle is running (step 2110), which could be either a hot smoke cycle or a cold smoke cycle. The smoke element is turned on for a specified fast smoke time period while the previously-selected cycle continues running (step 2120). One suitable example of a suitable fast smoke time period is 20 minutes, which means the smoke element is turned on in step 2120 for 20 minutes. As long as the fast smoke time period has not expired (step 2140=NO), method 2100 loops back to step 2130 and continues until the fast smoke time period expires (step 2140=YES). Control of the smoke element is then returned to the previously-selected cycle (step 2150), and the previously-selected cycle continues running (step 2160). Method 2100 is then done. A fast smoke cycle is a way to essentially force the smoke element on for the fast smoke time period to add more smoke to a cold smoke cycle that is currently running or a hot smoke cycle that is currently running, or to start a box of new wood chips smoking.

Figure 22:
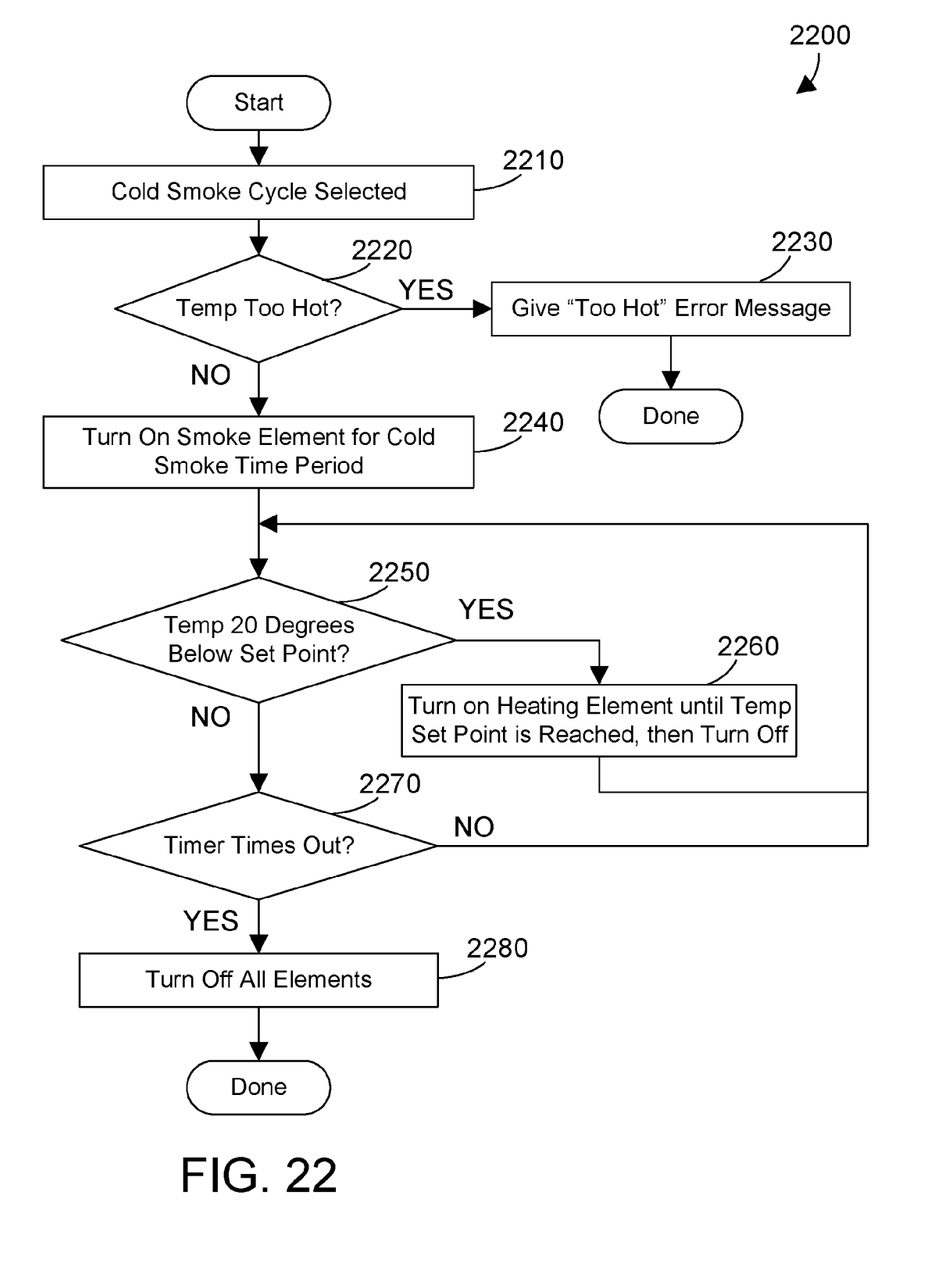
FIG. 22 is a flow diagram of a method for a cold smoke cycle.

Referring to FIG. 22, a method 2200 shows steps that are performed when a user selects a cold smoke cycle (step 2210). In one particular implementation, a cold smoke cycle has an allowable temperature range of 50 degrees Fahrenheit (10 degrees Celsius) to 125 degrees Fahrenheit (52 degrees Celsius). If the current temperature of the cooking chamber is too hot (step 2220=YES), the user is prompted with an error message on the display indicating the smoker is too hot to start a cold smoke cycle (step 2230), and method 2200 is done. When the current temperature of the cooking chamber is not too hot (step 2220=NO), the smoke element is turned on for the cold smoke time period (step 2240). Should the temperature in the cooking chamber drop to 20 degrees Fahrenheit (11 degrees Celsius) below the set point (step 2250=YES), the heating element is turned on until the temperature set point is reached, and is then turned off (step 2260). When the temperature in the cooking chamber does not drop 20 degrees from the set point (step 2250=NO), as long as the time has not timed out (step 2270=NO), method 2200 loops back to step 2250 and continues until the timer times out (step 2270=YES), at which time any element that is on is turned off (step 2280). Note that in the vast majority of cases, the smoke element will provide sufficient heat to maintain the temperature within the cooking chamber within 20 degrees Fahrenheit (11 degrees Celsius) from the temperature set point. Thus, for most cases when cold smoking, the heating element will never be turned on in step 2260. The 20 degree Fahrenheit (11 degree Celsius) set point is there to provide acceptable cold smoke functionality even in cold weather. Thus, if a user wants to smoke a block of cheddar cheese when the outside temperature is 10 degrees Fahrenheit (−12 degrees Celsius), the heating element may need to be turned on in step 2260 when the temperature drops to 20 degrees Fahrenheit (11 degrees Celsius) below the set point (step 2250=YES).

An electrical block diagram of a smoker 2300 with various options as described above is shown in FIG. 23. A control panel 2310 includes a processor 2320, a memory 2330, a keypad/display 1700, a wireless interface 2360, and a light source 1610. The wireless interface 2360 is optional, and thus need not be present on the smoker 2300. A Bluetooth interface is one suitable implementation for the wireless interface 2360. A Wi-Fi interface is another suitable implementation for the wireless interface 2360. An infrared or radio-frequency (RF) interface is yet another suitable implementation for the wireless interface. The wireless interface 2360 includes any suitable wireless interface, whether currently known or developed in the future.

Figure 23:
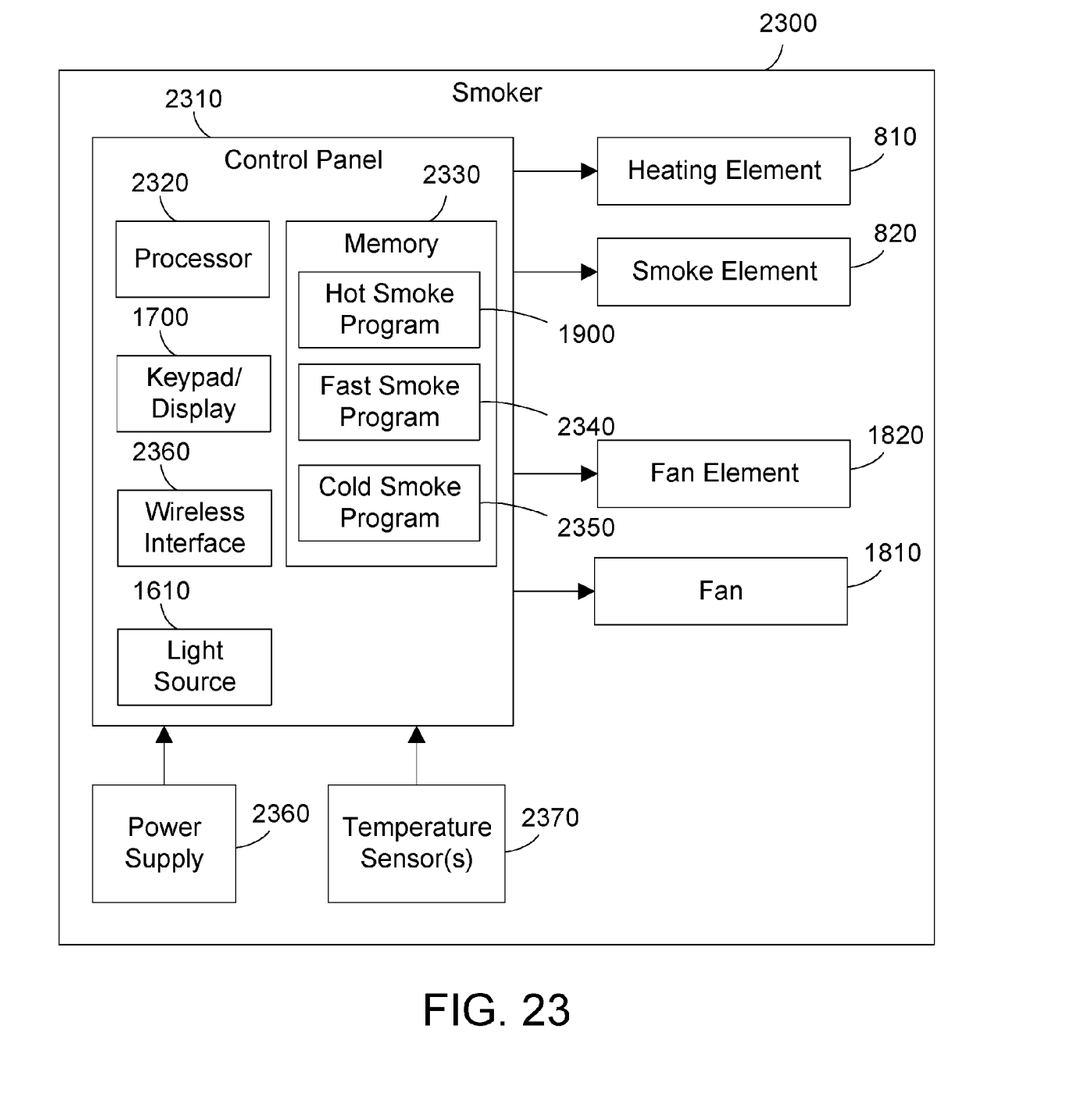
FIG. 23 is an electrical block diagram of a food smoker as disclosed and claimed herein.

The processor 2320 could be any suitable microprocessor or microcontroller. Memory 2330 is most preferably non-volatile memory, which could be separate from processor 2320 or could be within processor 2320. The memory 2330 includes the programs for the smoking cycles described above with reference to FIGS. 19-22, including a hot smoke program 1900, a fast smoke program 2340 and a cold smoke program 2350. A power supply 2360 provides power to the control panel 2310 and to heating elements 810, 820 and 1820 and to fan 1810. The power supply 2360 preferably runs off line power, which in the United States is 120 volt alternating current power. The smoker 2300 includes one or more temperature sensors 2370, which includes a temperature sensor in the cooking chamber and may optionally include a temperature sensor for sensing the temperature of the ambient air outside the smoker. Any suitable temperature sensor could be used, including thermistors or other electronic or electrical temperature sensors. The heating element 810 and smoke element 820 are discussed in detail above. The fan 1810 and fan element 1820 are optional components shown in FIG. 18 and discussed above. The fan 1810 is shown in FIG. 23 being controlled by controller 2310. This means the fan 1810 could be selectively turned on and off by the controller 2310 as part of the program for a smoking cycle, or could be turned on anytime the control panel 2310 is turned on. In the alternative, the fan 1810 could be wired to the power supply 2360 such that anytime the power supply 2360 is active, the fan 1810 will run.

The smoker disclosed herein provides many advantages over known smokers. A water fill door and water fill spout allow refilling the water pan with water without opening the door to the cooking chamber. An innovative water pan covers most of the cooking chamber to catch grease while allowing for heat to rise through louvers on the water pan to the food racks in the cooking chamber. A light in the control panel is reflected by a reflector in the door to illuminate the cooking chamber when the door is closed. A vent near the wood chip box allows adjusting the flow of air near the wood chip box. The wood chip box itself has an innovative design with holes that allow better airflow, and hence combustion, of the wood chips within the wood chip box, and allows the wood chips to wick for cold smoking. The wood chip box additionally includes a hinged lid that allows one-handed emptying of the wood chip box, and a recessed area on its bottom that receives the smoke element. The optional convection fan provides more even distribution of heat in the cooking chamber. The independently-controlled heating element and smoke element provide the capability of hot smoking, cold smoking, and fast smoking as discussed above. These combination of features result in an innovative smoker designed for home use that provides functionality not found in known smokers.

An electric food smoker includes a heating element that provides a main source of heat and a separate smoke element that is controlled independently from the heating element and provides heat to a wood chip box. Separate control of the heating element and the smoke element allows providing a cold smoke cycle for the food smoker. A hot smoke cycle provides independent control of the heating element and the smoke element according to a hot smoke program. A fast smoke cycle allows adding more smoke during any existing cycle.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the water fill door 220 and water fill spout 300 are shown in the figures on an electric smoker, these features could be used on gas or charcoal smokers as well. In addition, while the fast smoke cycle and cold smoke cycle are discussed above in the context of an electric smoker, these features could be used on gas smokers as well.

The invention claimed is:

1. A food smoker comprising:
   a first heating element;
   a second heating element; and
   a controller that independently controls the first heating element and the second heating element by turning the first heating element on and off independently of the state of the second heating element and by turning the second heating element on and off independently of the state of the first heating element according to a plurality of programs stored in a memory including:
   a hot smoke program;
   a cold smoke program; and
   a fast smoke program that runs simultaneously with a currently-running hot smoke program or a currently-running cold smoke program.

2. The food smoker of claim 1 wherein as long as temperature of a cooking chamber in the food smoker is within a specified difference from a specified cold smoke temperature, the cold smoke program turns on the second heating element and does not turn on the first heating element to maintain the specified cold smoke temperature.

3. A food smoker comprising:
   a first heating element;
   a second heating element
   a controller that independently controls the first heating element and the second heating element by turning the first heating element on and off independently of the state of the second heating element and by turning the second heating element on and off independently of the state of the first heating element according to a plurality of programs stored in a memory;
   a water pan that substantially covers the first heating element and that includes a plurality of louvers positioned in proximity of the first heating element so heat generated by the first heating element can rise through the louvers to food being smoked in the food smoker; and
   a water fill spout coupled to a water fill door on a side of the smoker, wherein opening the water fill door provides access to pour water into the water fill spout from outside the smoker, wherein the water fill spout directs the water to a reservoir in the water pan.

4. A food smoker comprising:
   a cabinet including a left side panel, a back panel, a right side panel, and a door that define a cooking chamber;
   a first heating element in the cooking chamber that has a first power rating;
   a second heating element that has a second power rating less than a third of the first power rating of the first heating element;
   a controller that independently controls the first heating element and the second heating element according to a plurality of programs stored in memory, wherein the plurality of programs includes:
   a hot smoke program;
   a cold smoke program; and
   a fast smoke program that runs simultaneously with a currently-running hot smoke program or a currently-running cold smoke program; wherein the controller comprises:
   a display and a plurality of keys that allow a user to specify time and temperature that apply to a selected one of the plurality of programs;
   a wireless interface that allows a handheld device to control the controller; an adjustable vent in proximity to a wood chip box that allows a user to adjust the adjustable vent to increase or decrease airflow near the wood chip box;
   a water pan that substantially covers the first heating element and includes a plurality of louvers positioned in proximity of the first heating element so heat generated by the first heating element can rise through the louvers to a cooking chamber in the food smoker;
   a water fill spout coupled to a water fill door on one of the left side panel and the right side panel of the smoker, wherein opening the water fill door provides access to pour water into the water fill spout from outside the smoker, wherein the water fill spout directs the water to a reservoir in the water pan;
   wherein the wood chip box comprises:
   a bottom portion that has a recess dimensioned to receive the second heating element;
   a plurality of side portions, wherein at least one of the plurality of side portions has a plurality of holes; and
   a lid that has a plurality of openings, wherein the lid is pivotally attached to the wood chip box so the wood chip box may be emptied with one hand by turning the wood chip box upside down, which allows the lid to open by force of gravity and allows the contents of the wood chip box to be emptied by force of gravity;
   a light source controlled by the controller that shines to a reflector in the door of the food smoker, wherein the reflector directs the light from the light source to a cooking chamber of the food smoker when the door is closed.

\* \* \* \* \*